United States Patent [19]
Capps et al.

[11] Patent Number: 5,710,844
[45] Date of Patent: Jan. 20, 1998

[54] METHOD FOR SEARCHING AND DISPLAYING RESULTS IN A PEN-BASED COMPUTER SYSTEM

[75] Inventors: Stephen P. Capps, San Carlos; Shifteh Karimi, Menlo Park; Sarah Clark, Boulder Creek, all of Calif.

[73] Assignee: Apple Computer, Cupertino, Calif.

[21] Appl. No.: 889,660

[22] Filed: May 27, 1992

[51] Int. Cl.⁶ .................................................. G06K 9/20
[52] U.S. Cl. .................................. 382/317; 382/305
[58] Field of Search ........................... 395/144, 145, 395/146, 148, 934; 382/100, 229, 282, 305, 309, 317

[56] References Cited

U.S. PATENT DOCUMENTS

| | | | |
|---|---|---|---|
| 4,553,261 | 11/1985 | Froessl | 382/317 |
| 4,797,946 | 1/1989 | Katsuta et al. | 382/317 |
| 5,165,012 | 11/1992 | Crandall et al. | 395/144 |
| 5,172,245 | 12/1992 | Kita et al. | 382/317 |
| 5,179,652 | 1/1993 | Rozmanith et al. | 395/148 |

OTHER PUBLICATIONS

O'Connor, Rory J., "Apple Banking on Newton's Brain," San Jose Mercury News, Apr. 22, 1992.
Macintosh User's Guide, Apple Computer, Inc., 1991, pp. 114–117. Describes a method of finding files and characteristics of files by entering one or more search parameters.

*Primary Examiner*—Jose L. Couso
*Attorney, Agent, or Firm*—Hickman Beyer & Weaver

[57] ABSTRACT

A method for searching the contents of a memory device for a pen-based computer system, where the contents of the memory device are organized as one or more files, where each file contains records, and where a file has an associated "button" proved on a surface of the housing of the computer system. The method includes the .steps of: receiving a find-command from a user; receiving a selection search string from the user; searching the records of each file in the memory device for the search string; making a list of target files and the number of hits in each file; displaying indicators showing a summary of the list; and processing a user input with the summary. All of the records in all of the files are searched. The number of hits for each file are displayed.

11 Claims, 15 Drawing Sheets

METHOD FOR SEARCHING AND DISPLAYING RESULTS IN A PEN-BASED COMPUTER SYSTEM

BACKGROUND OF THE INVENTION

The present invention relates generally to searching of a computer data base and, more particularly, to methods for searching the memory of a pen-based computer system and displaying the results on a display screen.

A pen-based computer system is a small, often hand-held, computer system where the primary method for inputting data includes a "pen" or stylus. A typical pen-based computer system is housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of the stylus on the viewing screen and provides positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen. With suitable recognition software, text and numeric information can also be entered into the pen-based computer system in a similar fashion.

Besides serving as a notepad, pen-based computers can provide a number of useful functions, such as serving as an address book, an appointment calendar, a to-do list, etc. These functions can be tightly integrated with the operating system of the computer, permitting information input into one function to impact upon another function. In such an environment, deductive assistance would be a valuable addition to the functionality and value of the computer system.

Users often want to be able to find and display particular items, such as a string of characters. It is therefore desirable that a technique be available for searching the memory of a pen-based system and for displaying the results of that search in formats useful to users.

SUMMARY OF THE INVENTION

The present invention provides a method for searching the contents of a memory device for a pen-based computer system. The contents of the memory device are organized as one or more files and each file contains one or more records. A number of dedicated function buttons are provided on the front panel of the pen-based computer system. These buttons correspond to WHO (telephone book), WHAT (to-do list), WHEN (a calendar). A FILECABINET icon 58 represents a cross-reference function (XREF). These buttons represent corresponding files, where each file has one or more records contained therein. A FIND button is used to initiate a search for information. When the FIND button is depressed, the screen responds with a find-line 56 on the screen for entering a string of characters to be searched. The method includes receiving a find-command from a user, followed by receipt of a selection search string from the user. The records of each file in the memory device are searched for the search string with the result that a list of target files and the number of hits in each file is made. Display indicators are provided for each function button and the cross-reference icon showing a summary of the number of hits for each file. User inputs are processed such as displaying the contents of a record or displaying a cross-reference summary listing.

DETAILED DESCRIPTION OF THE PREFERRED EMBODIMENTS

Figure 1:
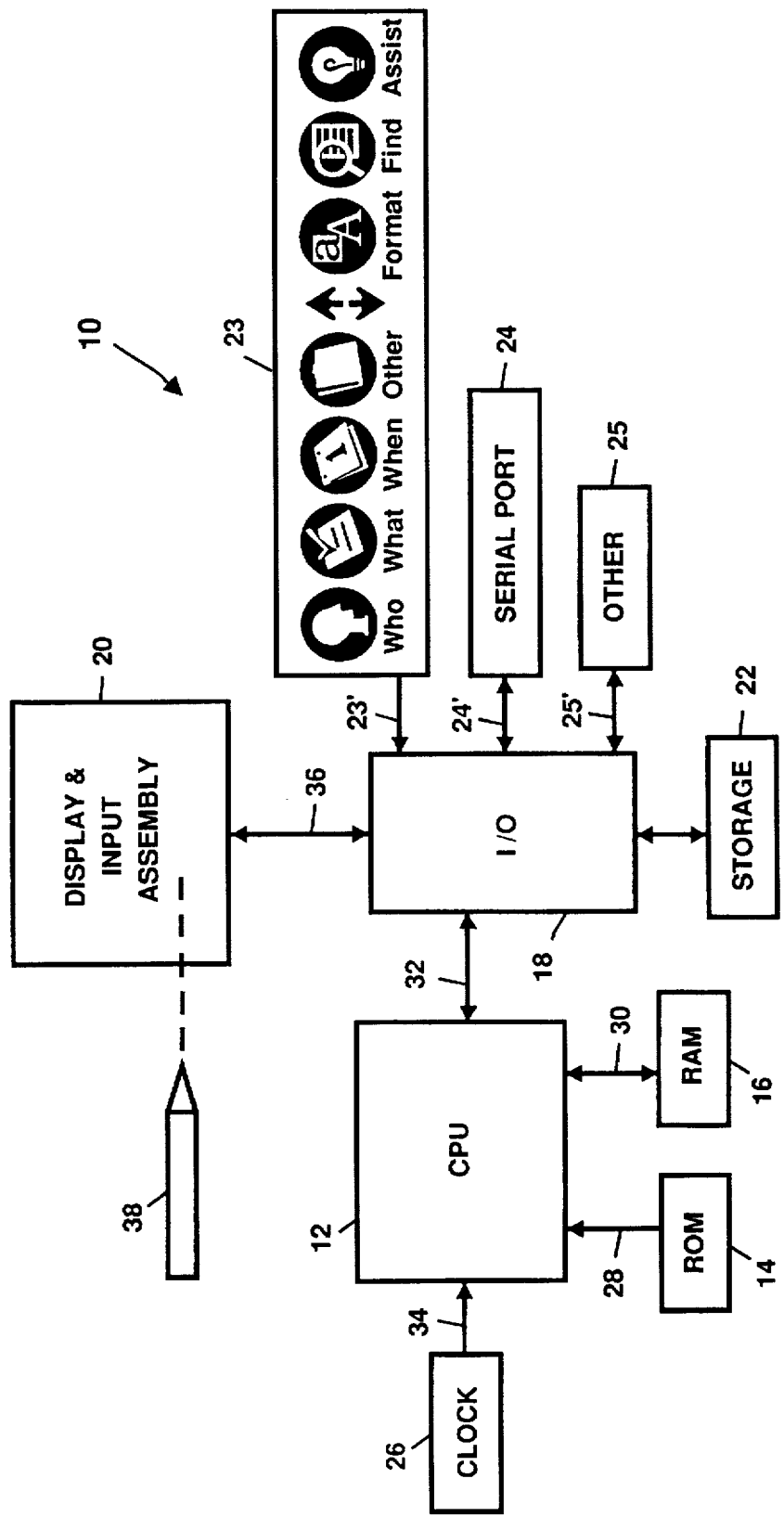
FIG. 1 is a block diagram of a pen-based computer system in accordance with the present invention.

In FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or non-volatile memory such as flash memory, and an array of input buttons 23 in a keypad. Other interfaces such as a serial port 24, an "other" I/O port 25, and a clock 26 are provided. The I/O input port 25 can be an infrared (IR) port permitting the system 10 to communicate with other data processing systems by IR transmission.

The CPU 12 is preferably a commercially-available, single chip microprocessor. While CPU 12 can be a complex instruction set computer (CISC) chip, it is preferable that CPU 12 be a reduced instruction set computer (RISC) chip which is known to be of generally higher performance than CISC chips. CPU 12 is coupled to ROM 14 by a uni-directional data bus 28. ROM 14 contains the basic operating system for the pen-based computer system 10. CPU 12 is connected to RAM 16 by a bi-directional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 32 to permit data transfers with peripheral devices, and to the clock 26 by a uni-directional data line 34.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, and the keypad 23, serial port 24, and I/O port 25. Keypad 23, serial port 24, and other port 25 are coupled to I/O circuitry 18 by data busses 23', 24', and 25', respectively.

Clock 26 provides a series of clock pulses and is typically coupled to an interrupt port of CPU 12 by the data line 34. The clock pulses are used to time various functions and events relating to the computer system 10. The clock 26 can be eliminated and the clock function replaced by a software clock running on CPU 12, but this tends to be a wasteful use of CPU processing power. In the present invention, clock 26 provides clock pulses at 60 hertz (Hz).

Display assembly 20 of pen-based computer system 10 is both an input and an output device. Accordingly, it is coupled to I/O circuitry 18 by a bi-directional data bus 30. When operating as an output device, the display assembly 20 receives data from I/O circuitry 18 via bus 30 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 32 on its surface. These position-sensitive membranes are also readily available on the commercial market. Combination display assemblies such as display assembly 20 which include both the LCD and the input membrane are commercially available from such vendors as Scriptel Corporation of Columbus, Ohio.

Other types of pointing devices can also be used in conjunction with the present invention. While the method of the present invention is described in the context of a pen-based system, other pointing devices such as a computer mouse, a track ball, or a tablet can be used to manipulate a pointer on a screen. Therefore, as used herein, the terms "pointing device", "pointing means", and the like will refer to any mechanism or device for pointing to a particular location on a screen of a computer display.

The aforementioned process produces the illusion that the stylus 38 has an "ink" which appears on the screen of the display assembly 20. Therefore, as used herein, the terms "inking" and "ink" will refer to the process and the result, respectively, of displaying a line or other indicia on the screen of display assembly 20 in response to the movement of stylus 38 on the screen.

Some type of mass storage 22 is generally considered desirable. However, the mass storage 22 can be eliminated by providing a sufficient amount of RAM 16 to store user application programs and data. In that instance, the RAM 16 could be provided with a back-up battery to prevent the loss of data even when the pen-based computer system 10 is turned off. However, it is generally desirable to have some type of long term storage 22 such as a commercially available miniature hard disk drive, or non-volatile memory such as flash memory or battery-backed RAM.

In operation, information is input into the pen-based computer system 10 by "writing" on the screen of display assembly 20 with the stylus 32. Information concerning the location of the stylus 32 on the screen of the display assembly 20 is input into the CPU via I/O circuitry 18. The CPU 12 then processes the data under control of an operating system and possibly an application program stored in ROM 14 and/or RAM 16. The CPU 12 then produces data which is output to the display assembly 20 to produce appropriate images on its screen.

Figure 2:
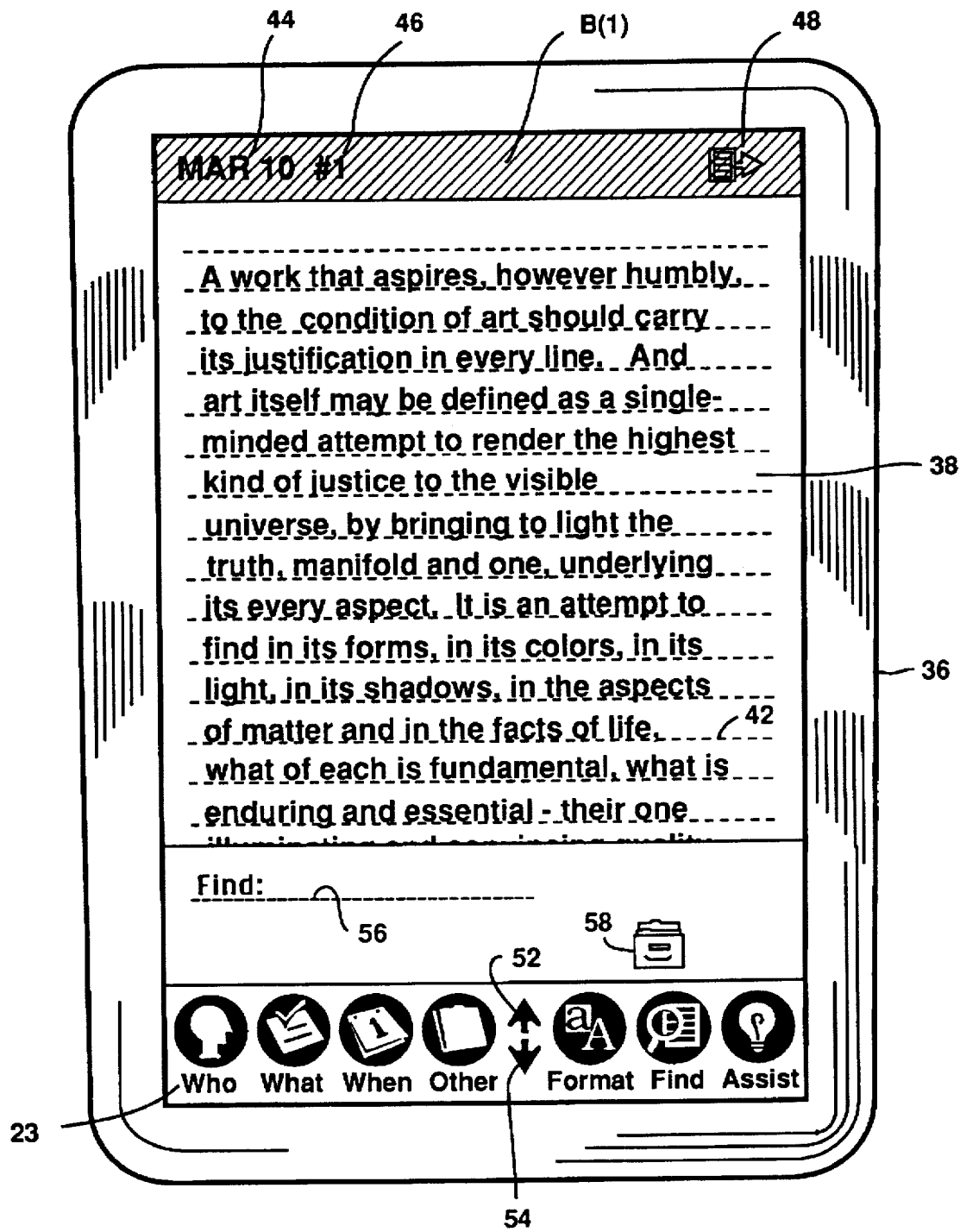
FIG. 2 is a pictorial representation of the screen of a pen-based computer system ready for operation in accordance with the present invention.

In FIG. 2, the pen-based computer system 10 is shown housed within a generally rectangular enclosure 36. The CPU 12, ROM 14, RAM 16, I/O circuitry 18, and mass storage 22 are preferably fully enclosed within the enclosure 36. The display assembly 20 is mostly enclosed within the enclosure 36, but a viewing screen 38 of the display assembly is exposed to the user. As used herein, the term "screen" will refer to the portion of the display assembly 20 which can display an image that can be viewed by a user. Also accessible to the user are the array of input buttons on the keypad 23.

Upon power-up, pen-based computer system 10 displays on screen 38 an initial note area N(1) including a header bar B(1) and a number of guidelines 42. The header bar B(1) preferably includes the date of creation 44 of the note N(1), a note number 46, and a sizing "button" 48. The optional guidelines 42 aid a user in entering text, graphics, and data into the pen-based computer system 10.

In this preferred embodiment, the array of input buttons 23 are not part of the screen 38 but, rather, are permanent, hard-wired input buttons coupled to the CPU 12 by I/O circuitry 18. Alternatively, the array of input buttons 23 could be "soft" buttons generated at a convenient location on the screen 38, in which case a button would be activated by touching the stylus to the screen over the image of the button. The array of input buttons 23 preferably include a number of dedicated function buttons and a pair of scroll buttons 52, 54.

The dedicated function buttons are WHO (telephone book), WHAT (to-do list), WHEN (a calendar). A FILE-CABINET icon 58 represents a cross-reference function (XREF). These buttons represent corresponding files, where each file has one or more records contained therein. A FIND button is used to initiate a search for information. When the FIND button is depressed, the screen responds with a find-line 56 on the screen for entering a string of characters to be searched.

Figure 3:
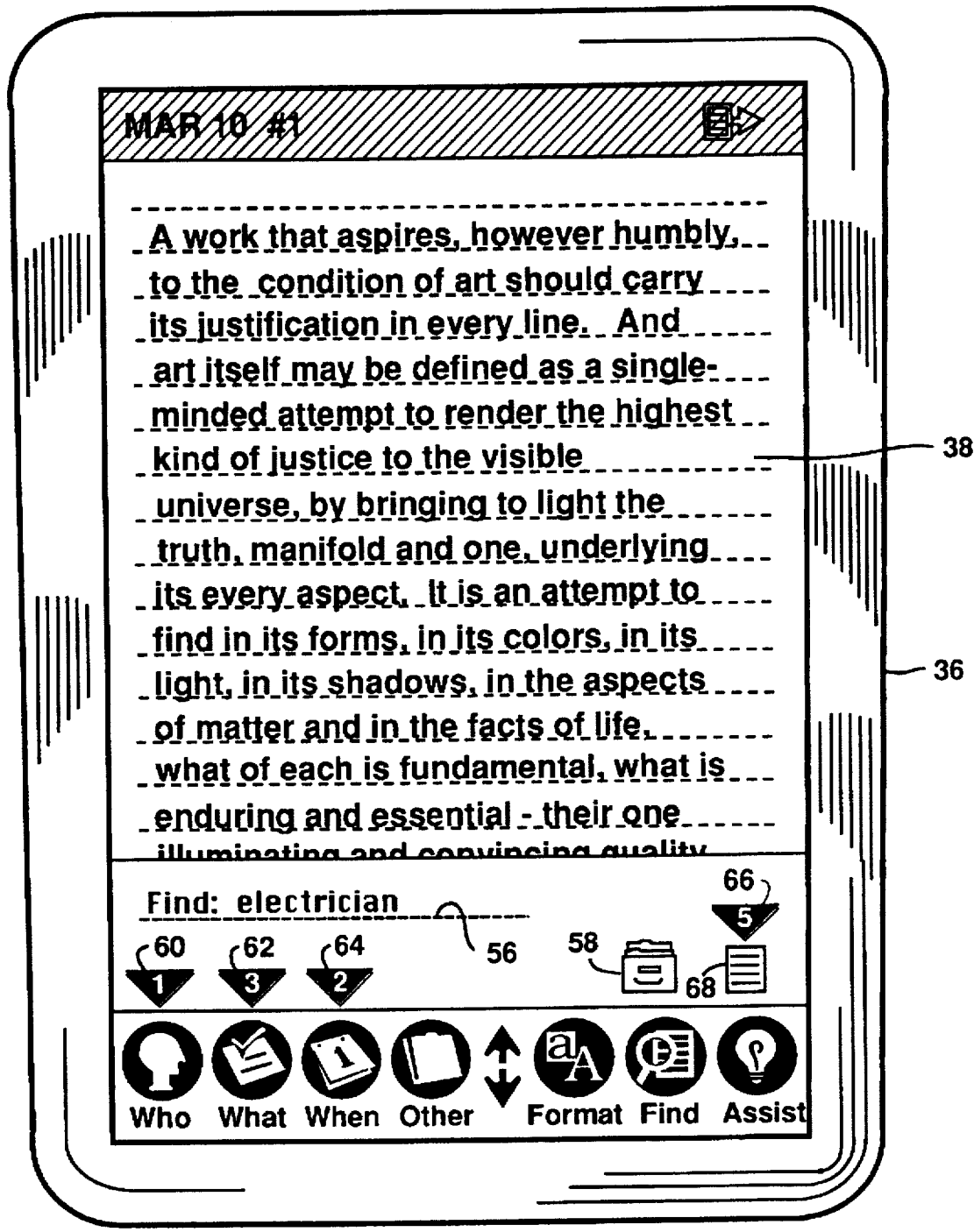
FIG. 3 illustrates the screen of a pen-based computer system showing a search string entered and displaying file indicators activated to show the number of hits for each file

FIG. 3 shows the screen of a pen-based computer system showing a search string "electrician" entered on the find-line 56. The system searches through each of the records in each files when the find command is initiated by entry of the string. Each button has a respective triangular-shaped indicator 60, 62, 64 located on the screen adjacent to a respective function button. FIG. 3 shows numbers in each of these indicators corresponding to the number of files found (or hits) for the search string. A triangular-shaped indicator 66 is also displayed adjacent a MEMO icon 68 presented on the screen 38.

Figure 4:
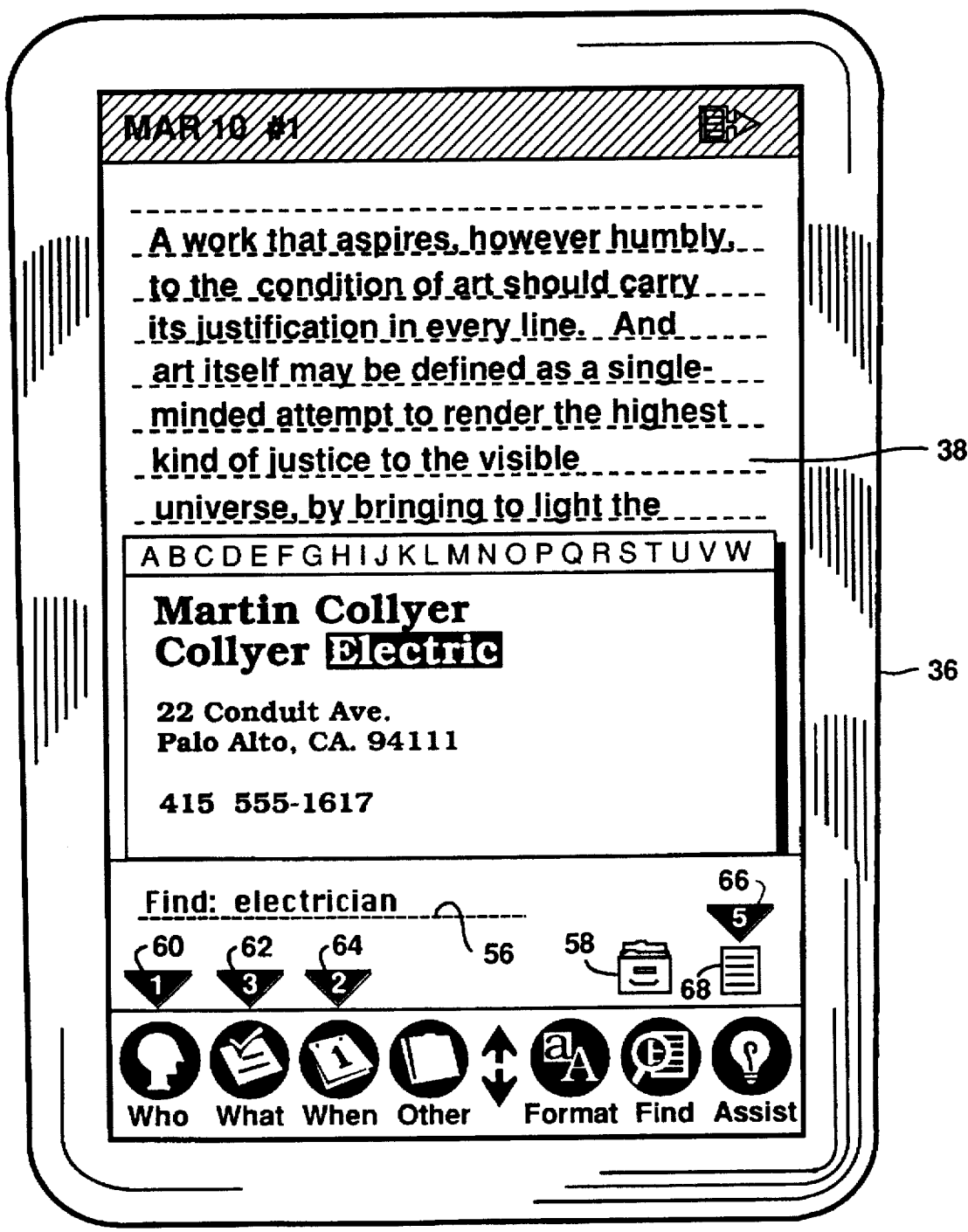
FIG. 4 illustrates the screen display when an address book entry is selected and viewed.

FIG. 4 illustrates the screen display when a WHO (address book) key is depressed and the address book entries related to the search string are presented for viewing. This screen display corresponds to the one entry found in this search.

Figure 5:
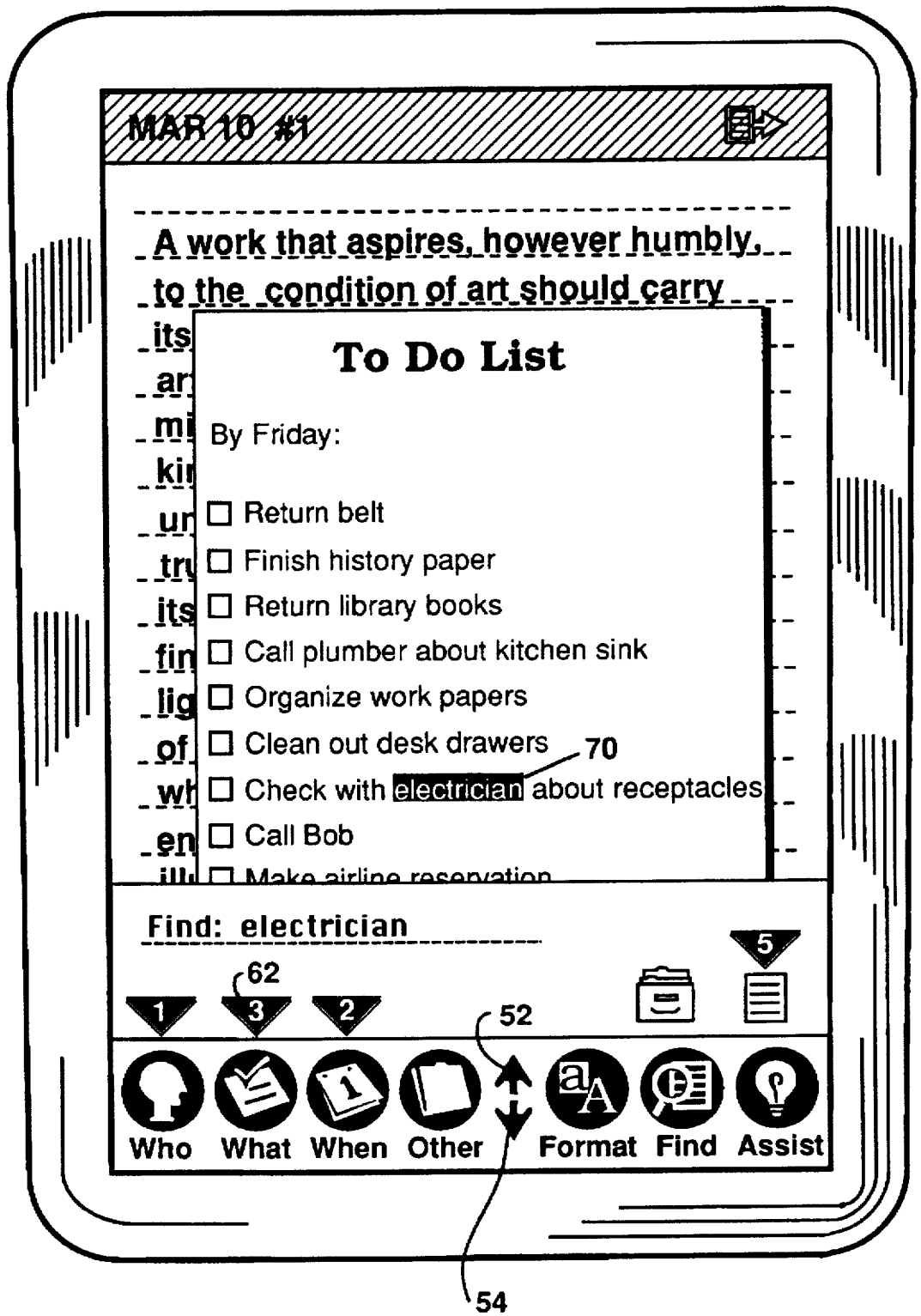
FIG. 5 illustrates the screen display when a to-do list is selected and viewed.

FIG. 5 illustrates the screen display when a WHAT (to-do list) button is selected. One of the entries includes a reference to the search string and is highlighted 70. As shown by the file indicator there are three hits in the WHAT file for this search string. Two other hits, or files, can be viewed. This is accomplished by using the up-down scroll buttons 52, 54 to scroll through the other hits. Alternatively, a pen touch on the indicator 62 will scroll through the list of hit records and provide them for display on the screen 38.

Figure 6:
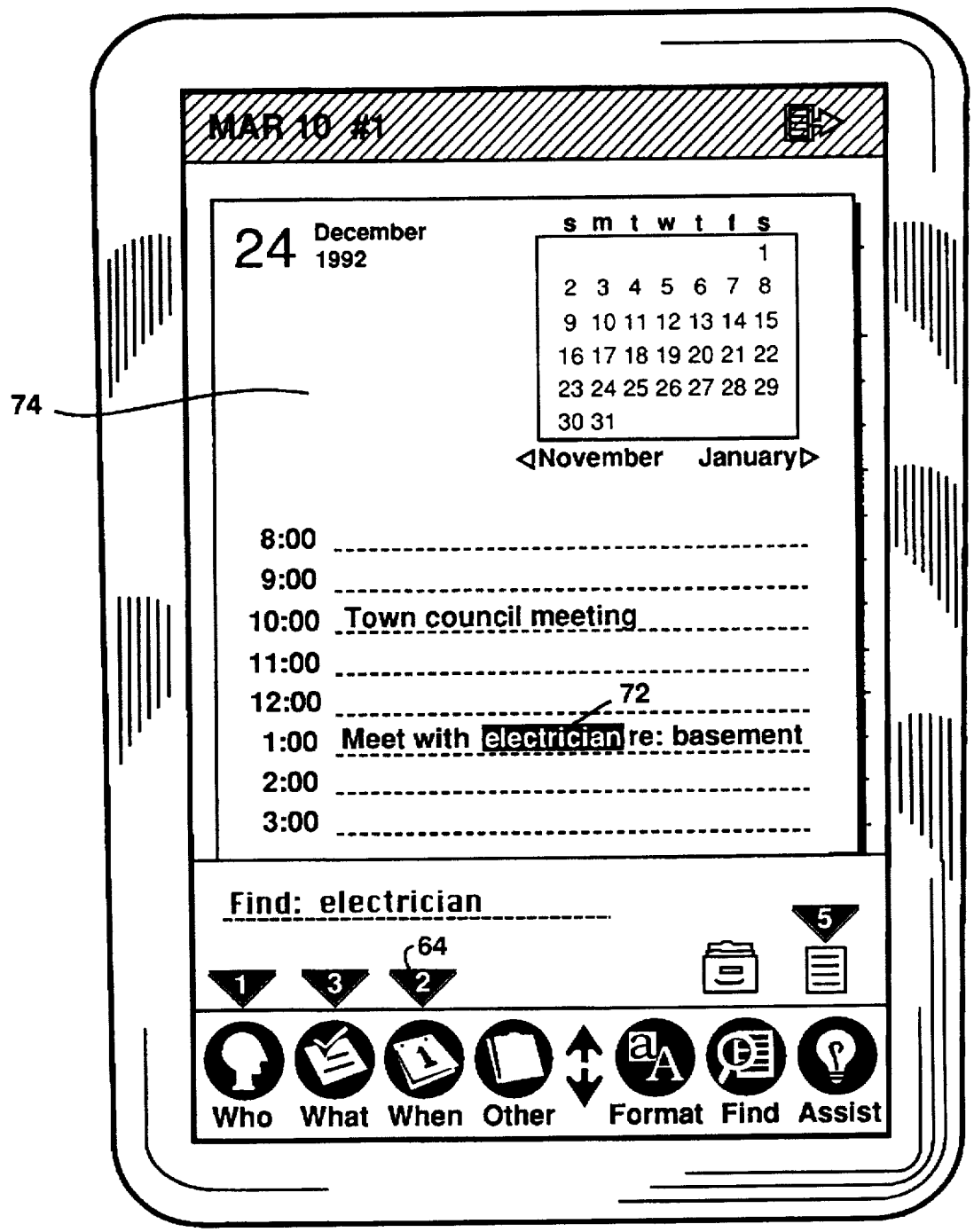
FIG. 6 illustrates the screen display when a calendar page is selected and viewed.

FIG. 6 illustrates the screen display when a WHEN (calendar) button is selected. The search string is highlighted 72 on a selected record (calendar page) 74 within the calendar file. The file indicator 64 shows that two records were found in the search. The up-down scroll buttons 52, 54 or pen-touches can be used to scroll to the other records found in the search.

Figure 7:
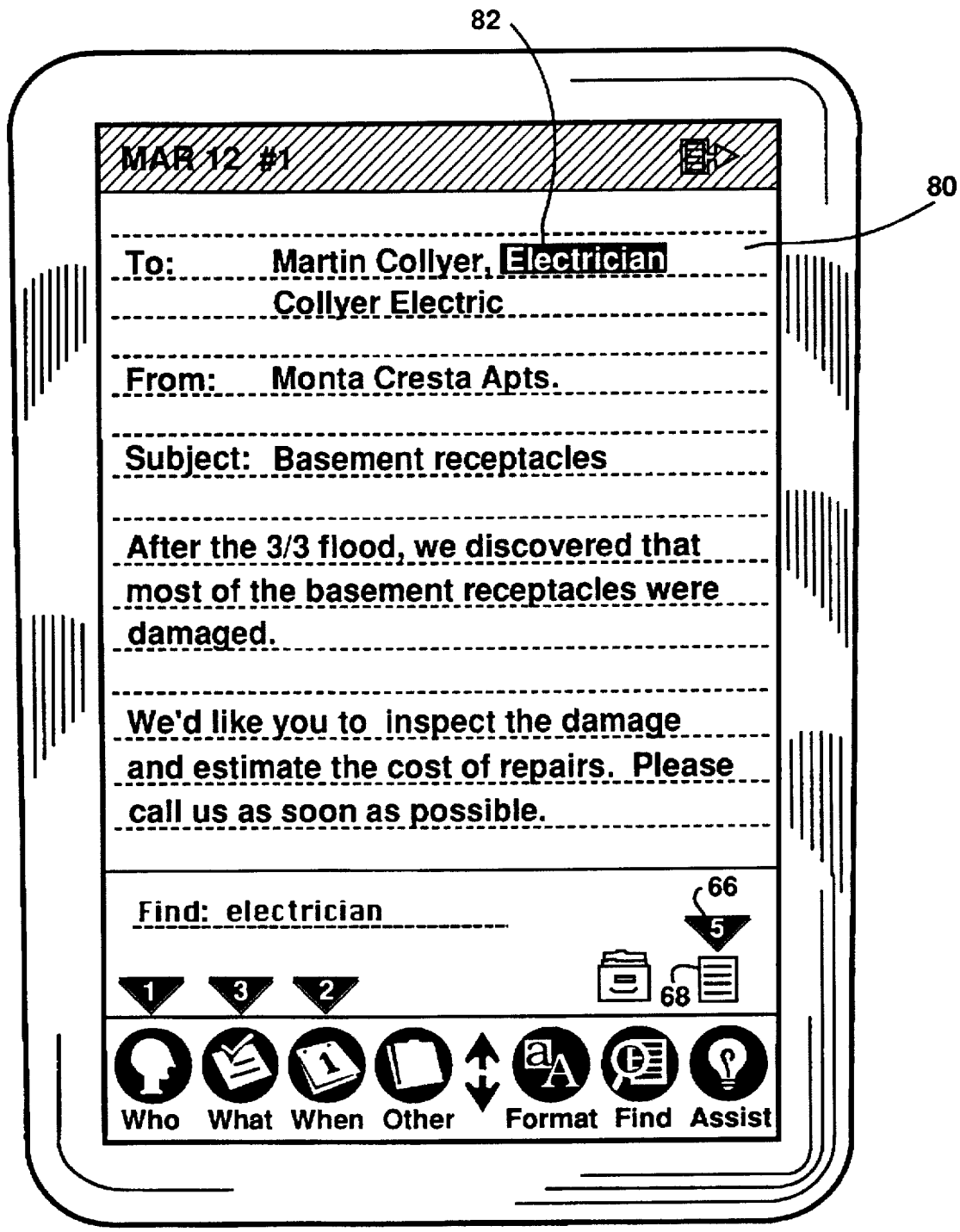
FIG. 7 illustrates the screen display when a memo is selected and viewed.

FIG. 7 illustrates the screen display when a memo is selected by touching the MEMO icon 68 with the pen. A memo 80 is displayed on the screen with the searchstring highlighted 82. Five total records were found in the search and the other four records can be presented on the screen by use of the scroll buttons 52, 54 or by touching the file indicator 66.

Figure 8:
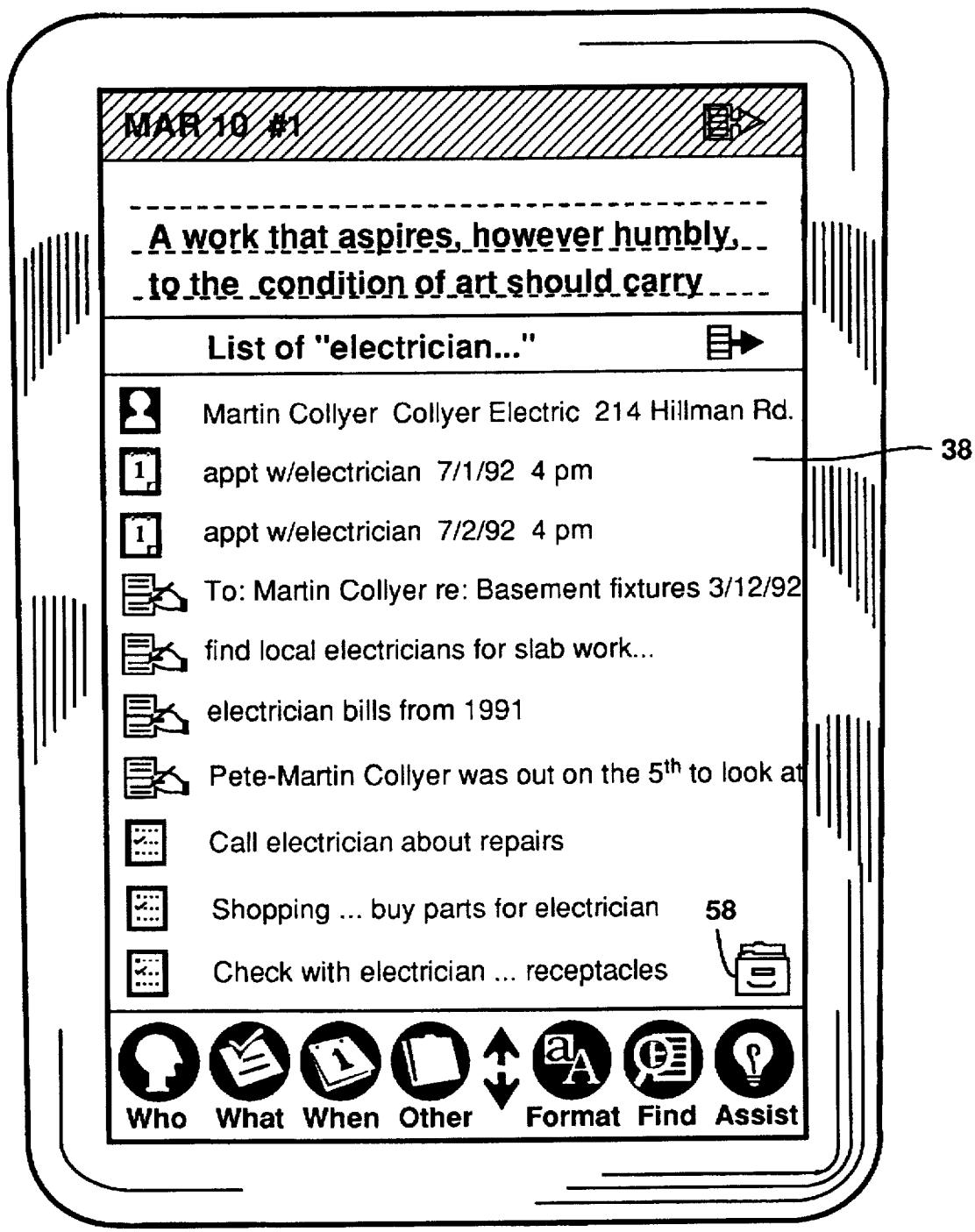
FIG. 8 illustrates the screen display when a cross reference list is selected and viewed.

FIG. 8 illustrates the screen display when a cross reference list is selected by touching the FILECABINET icon 58. As illustrated in the Figure, the screen 38 displays a cross reference list of summaries of all instances of the search string found in all of the flies. Each file has a distinctive icon for indicating the file source of the records summarized on the screen.

Figure 9:
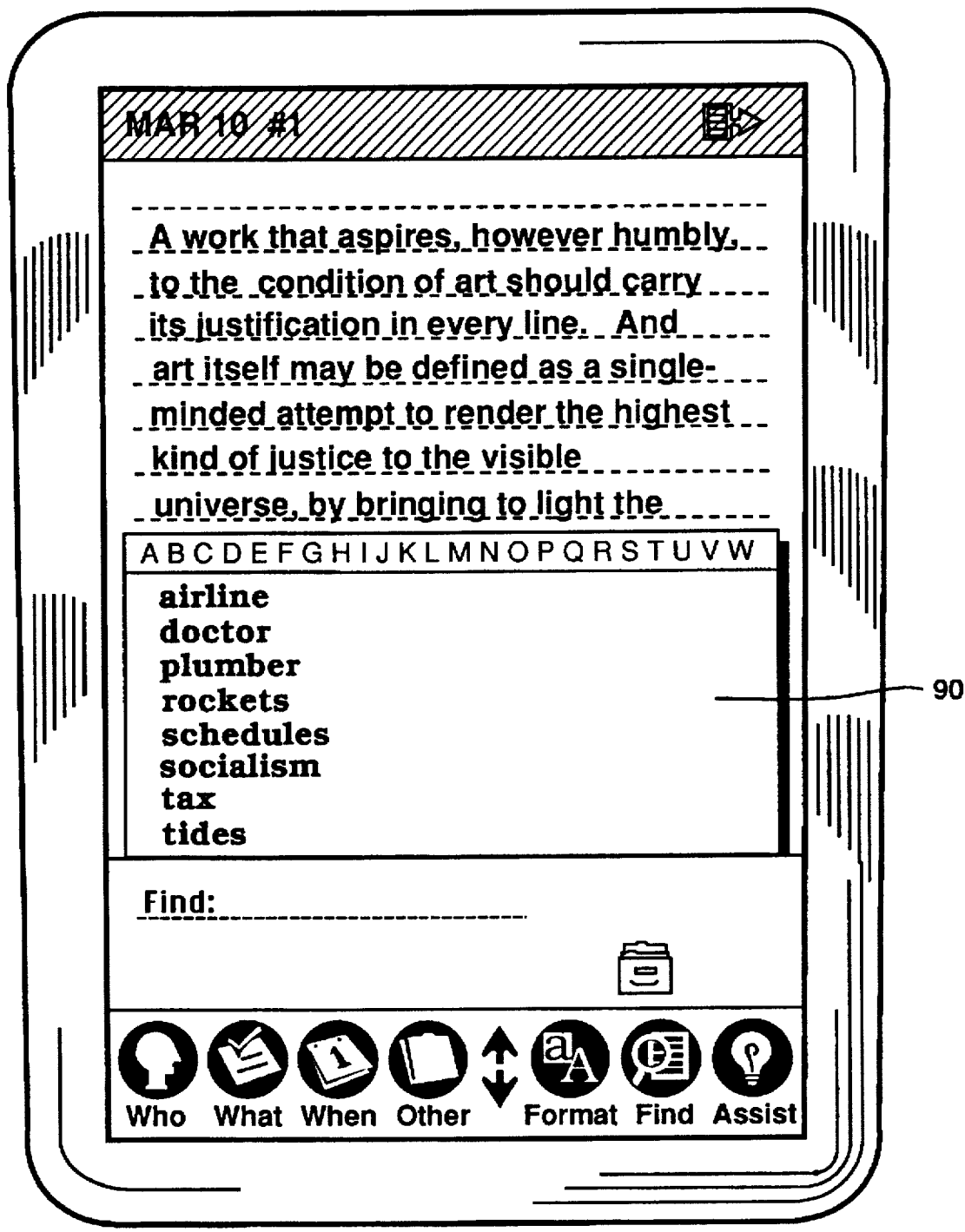
FIG. 9 illustrates the screen display when an index list is selected and viewed.

FIG. 9 illustrates the screen display when an index list 90 is selected and viewed without any specific search string being entered. The index list 90 is selected by depressing the FIND button and touching the FILECABINET (cross-reference) icon 56. An alphabetical index list 90 of various categories is then displayed.

Figure 10:
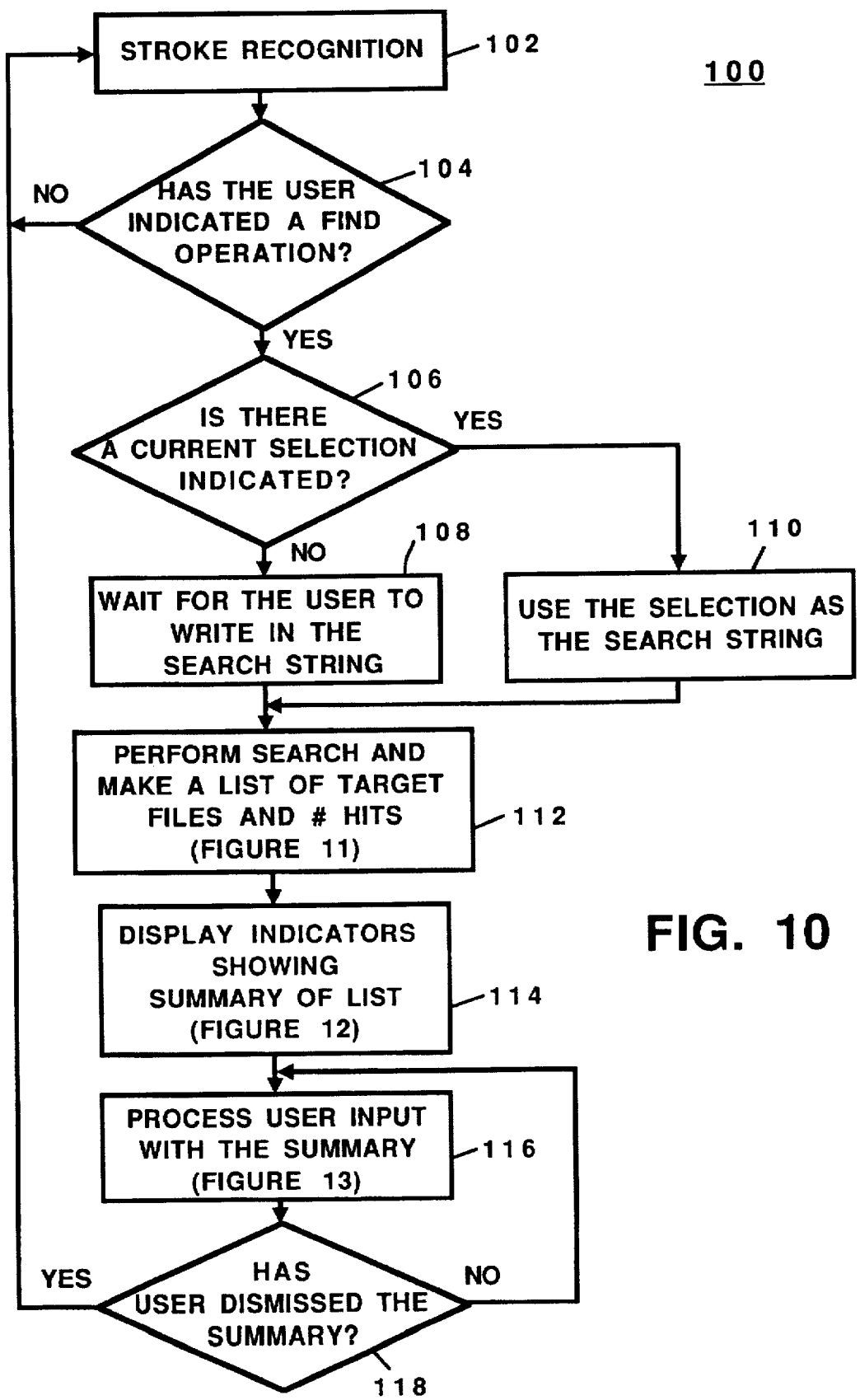
FIG. 10 is a flow diagram illustrating a sequence for processing a user input.

FIG. 10 shows a flow diagram 100 illustrating a sequence of steps for processing a user request. A stroke recognition step 102 represents recognition of user entries into the system. Step 104 is a decision step asking whether the user has depressed the FIND button. If so, step 106 asks if the user has entered a search string. If not, 108 waits for entry of the search string. If yes, step 110 uses the selection as a search string. Step 112 performs the search an makes a list of target files and the corresponding hits (files) found in the search. Step 114 displays the indicators 60, 62, 64, 66 showing a summary of the list. Step 116 process the user's input with the summary to provide the specific information desired by the user. Decision step 118 asks whether the user has dismissed the summary. If not, a return is made to step 116. If yes, the program returns to wait for user input.

Figure 11:
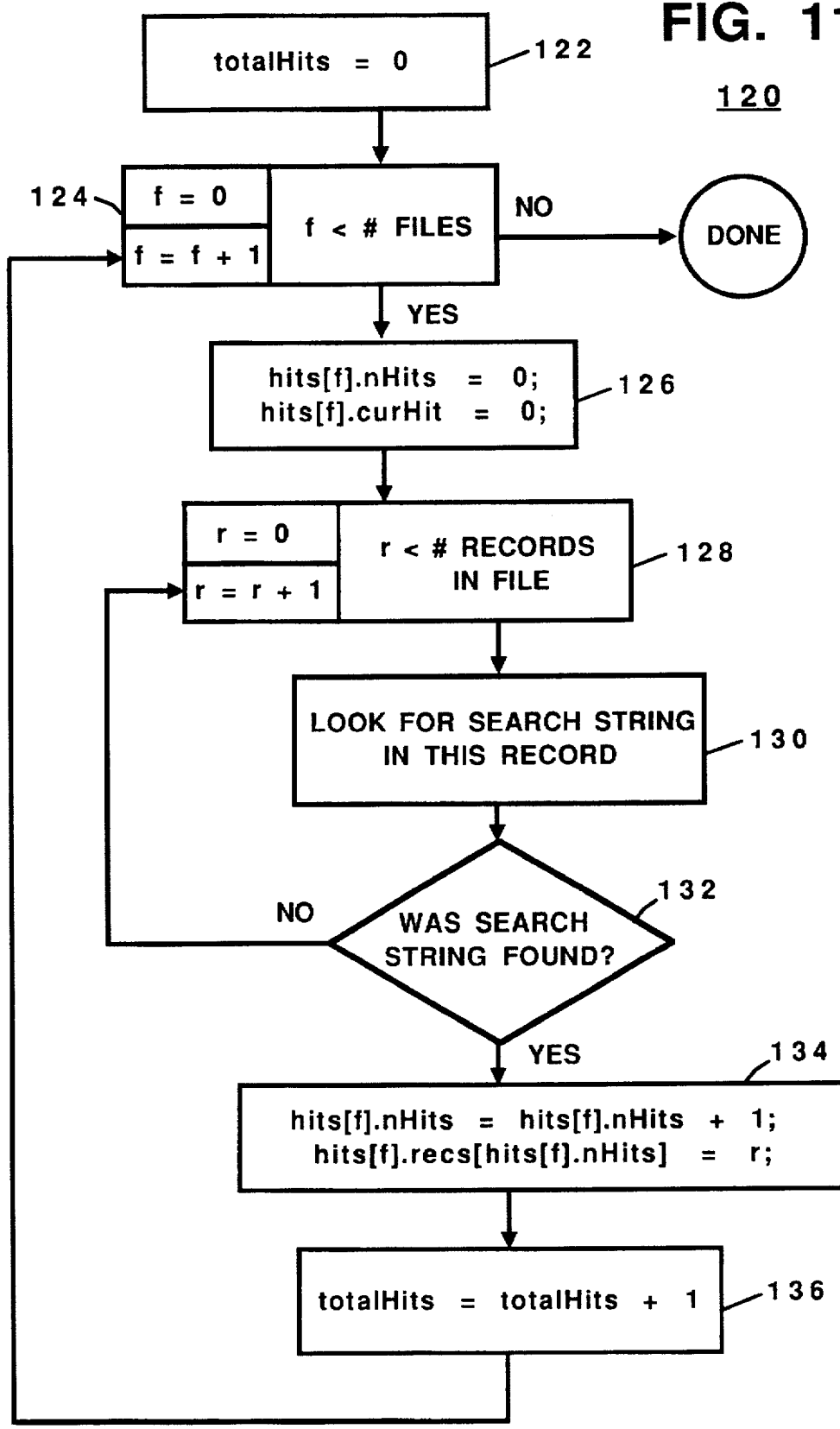
FIG. 11 is a flow diagram illustrating the steps of searching and making a list of target files and the number of hits.

FIG. 11 is a flow diagram 120 illustrating more detailed steps of searching and making a list of target files and the number of hits as indicated by step 112 of FIG. 10. Block 124 indicates that files are available to be searched. Block 128 indicates that each record in a file is to be searched by step 130 for the search string. If a hit is made, step 132 directs the program to step 134. A triple array of structs stores information about the field and records hit and the number of file hits. Step 136 increments the total hit count.

Figure 12:
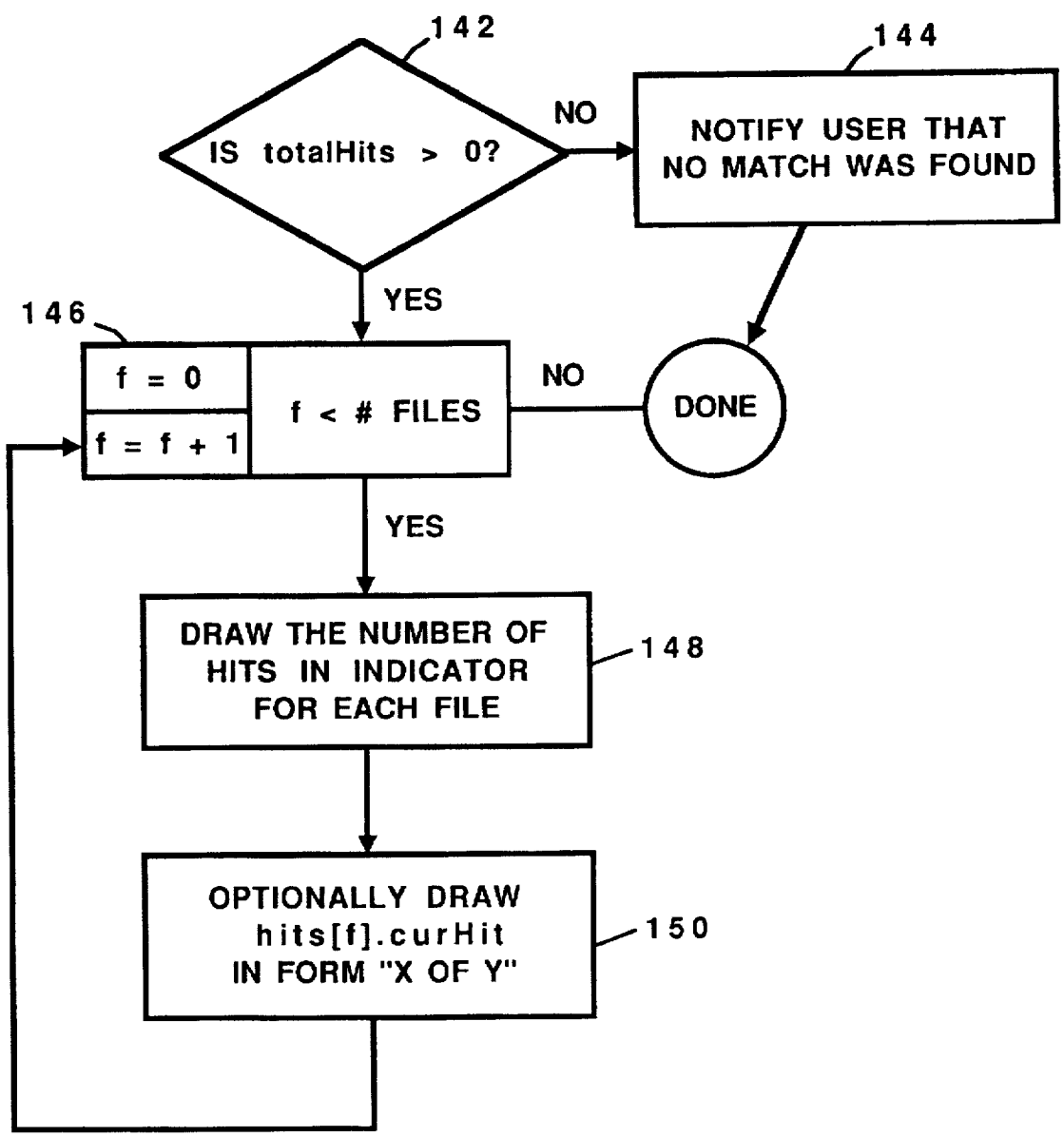
FIG. 12 is a flow diagram illustrating the steps for providing display indicators showing a summary of hits for each file.

FIG. 12 is a flow diagram 140 illustrating the steps for providing display indicators showing a summary of hits for each file. Decision step 142 determines whether total hits are greater than one. If not, step 144 notifies the user that no match was found. If yes, block 146 searches through each of the files and step 148 draws the number of hits (records found) in the indicator for each file. Step 150 indicates an optional display of hits being displayed as "1" of "3".

Figure 13:
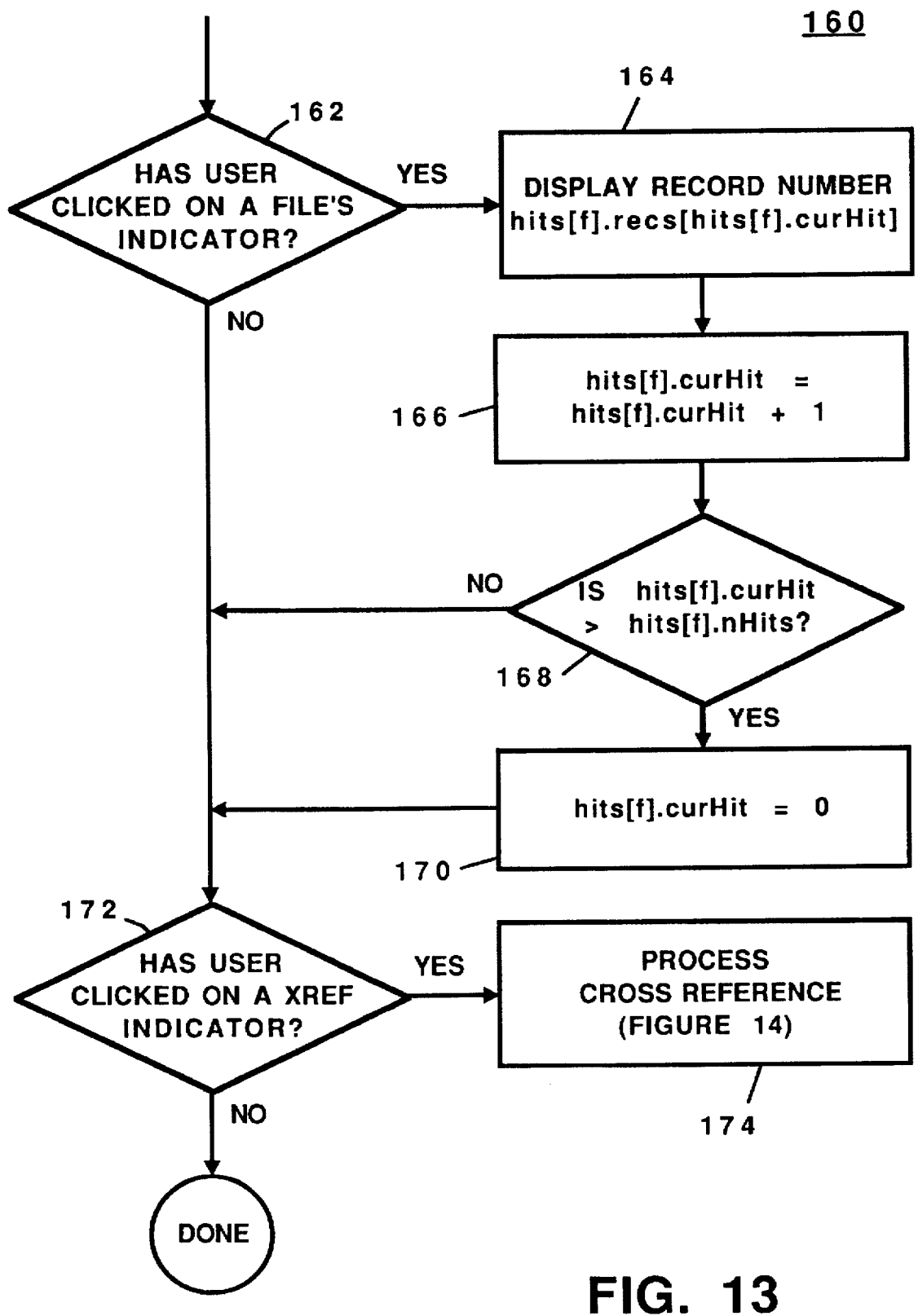
FIG. 13 is a flow diagram illustrating the steps for processing user input with the summary.

FIG. 13 is a flow diagram 160 illustrating the steps for processing a user input with the summary. Decision step 162 determines whether a user has clicked on one of the file indicators. If so, step 164 displays the record number. Step 166 increments the current hits index to display a new record. Decision step 168 determines if the current hits count exceed the number of hits. If so, the current hit index is set to zero in step 170. Decision step 172 tests whether a user has clicked on the cross-reference FILECABINET icon 56. If not, the program is done. If so, step 174 indicates that the cross reference is processed.

Figure 14:
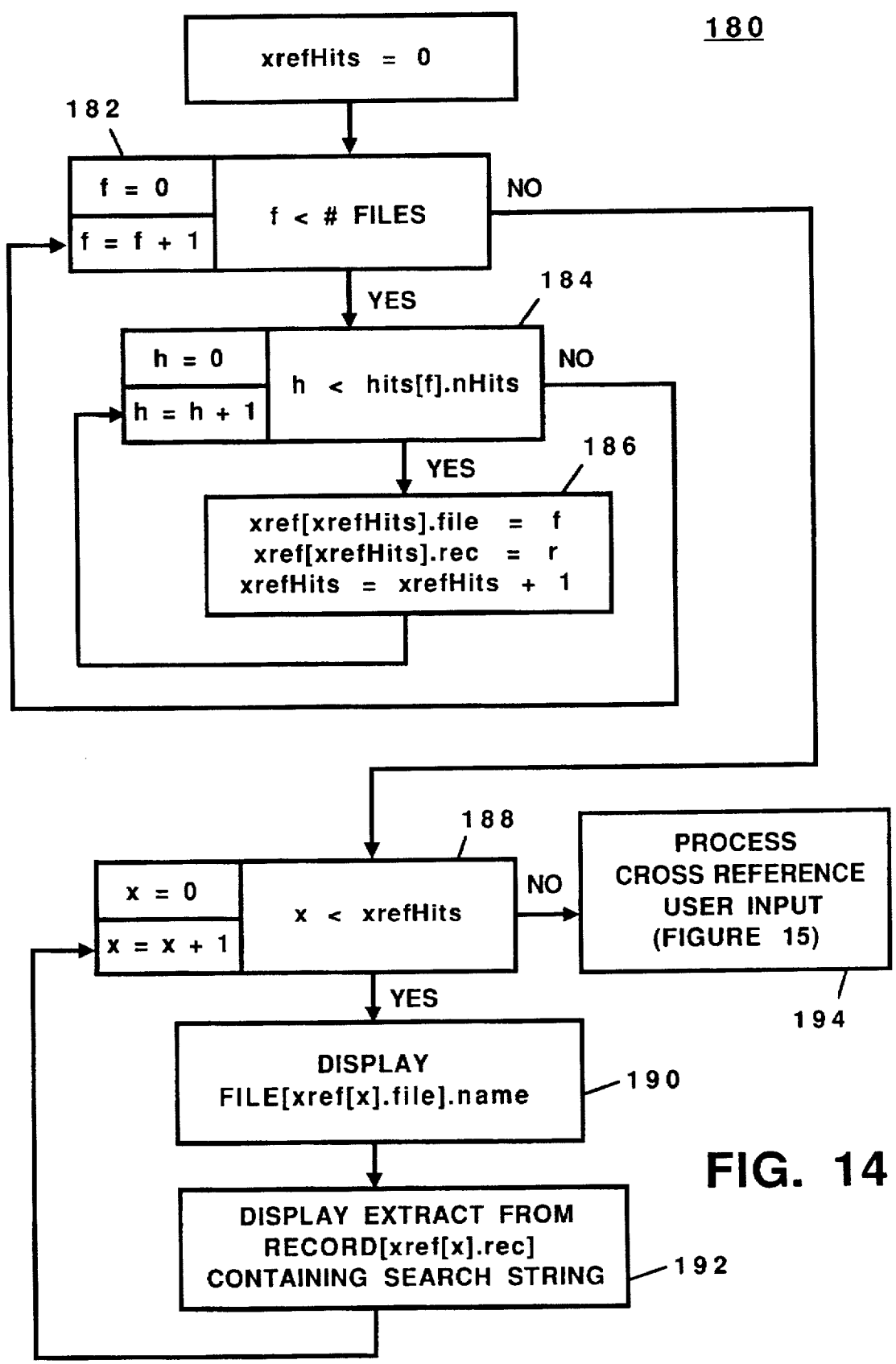
FIG. 14 is a flow diagram illustrating the steps for processing a cross reference.

FIG. 14 is a flow diagram 180 illustrating the steps for processing a cross reference. Step 182 processes all of the files. Block 184 process the hits in files so that step 186 makes a list of all of the files and record hit. After the list is made, The program proceeds to block 188, where cross-referenced hits are processed. Step 190 indicates that the files is displayed and step 192 indicates that an extract from the record containing the search string is displayed. Step 194 indicates that the user's cross reference input is processed.

Figure 15:
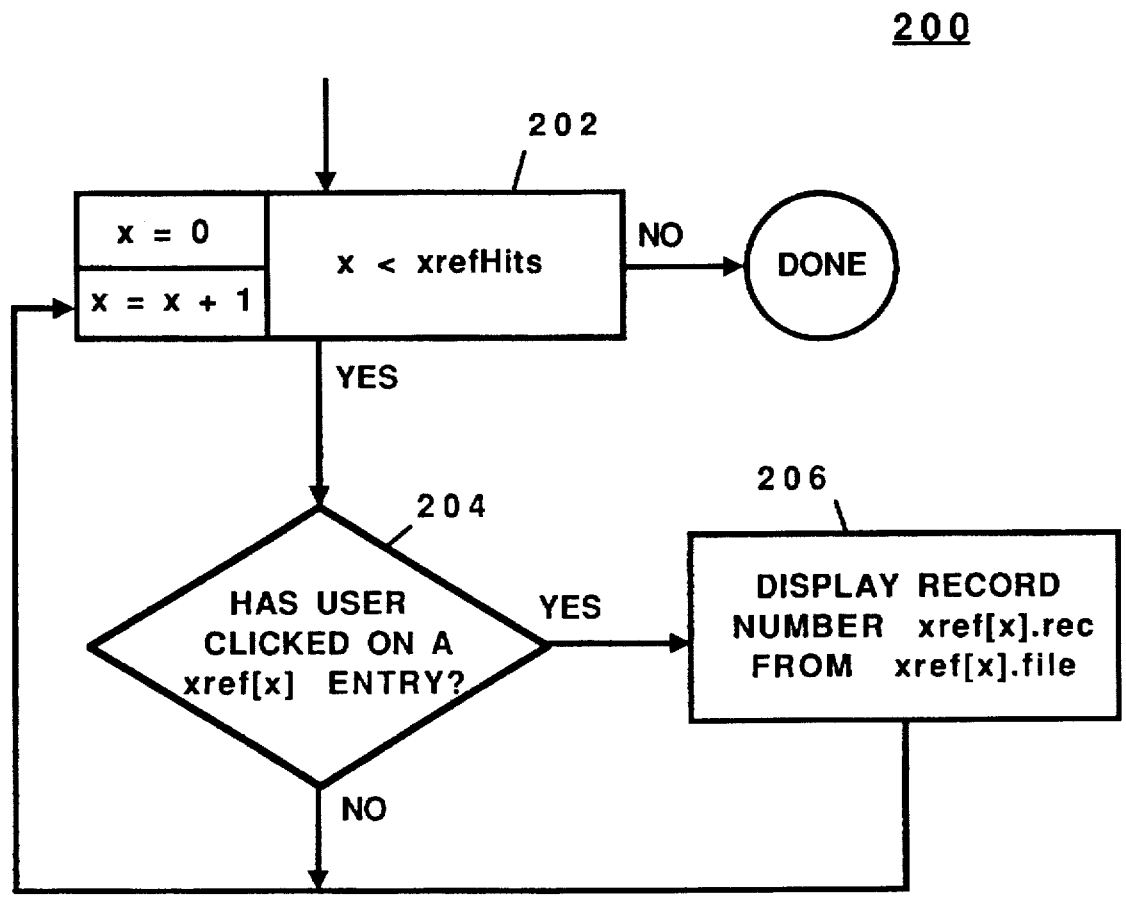
FIG. 15 is a flow diagram illustrating the steps for displaying a user request for display of a record.

FIG. 15 is a flow diagram 200 illustrating the steps for displaying a user request for a cross reference request for display of a record. Block 202 scans through all of the references. Decision step 204 determines whether a user has clicked on a particular reference. If so, step 226 displays that particular record number.

While this invention has been described in terms of several preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit of the present invention. For example, while the creation of new notes has been described as the division of previous notes, it is also possible to characterize note creation as adding additional notes to one or more previous notes. It is therefore intended that the following appended claims include all such alterations, modifications and permutations as fall within the true spirit and scope of the present invention.

We claim:

1. A method of controlling a screen display with an input pointer to search the contents of a memory device for a pen-based computer system, where the contents of the memory device comprise one or more files, where each file comprises one or more records, and where each file has an associated file selection button provided as part of the computer system, comprising the steps of:

receiving a search string which has been written or selected on the screen display with the pointer;

searching the content of each searchable record of each file that is associated with a selection button in the memory device for the search string;

determining the number of hits in each file; and displaying on the screen display a plurality of indicators, each having a corresponding file selection button, and each showing the number of hits in the file corresponding to the selection button.

2. The method of claim 1 further comprising the steps of:

selecting a file by contacting its corresponding file button with the pointer; and displaying on the screen display a record of the selected file, the record containing a hit.

3. The method of claim 1 further comprising the following steps:

selecting with the pointer a cross reference indicator on the screen display; and displaying on the screen display a list of summaries for all hits in all files, each summary including a displayed icon indicating the file in which the hit was found.

4. The method of claim 3 further comprising a step of displaying a record selected from the list of summaries.

5. The method of claim 1 wherein each of the plurality of indicator buttons is displayed adjacent its corresponding file selection button.

6. The method of claim 1 wherein the pointer is a stylus and wherein the search string is input by writing on the screen display within the stylus.

7. The method of claim 1 further comprising a step of receiving a find command input by depressing a find button with the pointer.

8. A pen-based computer system comprising:

processing means;

memory means coupled to said processing means;

a screen display coupled to said processing means which registers the position of a stylus;

a plurality of records organized in one or more files and held in the memory means;

a plurality of file buttons coupled to said processing means, each associated with a file held in the memory means;

means for searching the records of files associated with at least one file button for a string, said means for searching finding a hit when said string is found in a record; and a plurality of indicator buttons, each having a corresponding file button and each showing a number of hits found in its corresponding file by the means for searching.

9. The pen-based computer system of claim 8 further comprising a cross reference button which, when selected with the stylus, displays on the screen display a list of summaries for the hits in all files, each summary including a displayed icon characteristic of the file in which it was found.

10. The pen-based computer system of claim 8 further comprising a find button which, when selected, causes said computer system to display a find-line on the screen display, the find-line providing a region for entering a string with the stylus.

11. The pen-based computer system of claim 8 wherein each of the plurality of indicator buttons is displayed adjacent its corresponding file button.

* * * * *